J. G. VOGT & J. A. JOHNSON.
FLY TRAP.
APPLICATION FILED AUG. 15, 1910.

990,084.

Patented Apr. 18, 1911.

WITNESSES:
L. B. Woerner.
W<sup>m</sup> Bushong.

INVENTORS
John A. Johnson &
Jacob Vogt,
By Minturn T. Woerner.
ATT'YS.

UNITED STATES PATENT OFFICE.

JACOB G. VOGT AND JOHN A. JOHNSON, OF TOPEKA, KANSAS.

FLY-TRAP.

990,084.      Specification of Letters Patent.     Patented Apr. 18, 1911.

Application filed August 15, 1910. Serial No. 577,315.

*To all whom it may concern:*

Be it known that we, JACOB G. VOGT and JOHN A. JOHNSON, citizens of the United States, residing at Topeka, in the county of Shawnee and State of Kansas, have invented certain new and useful Improvements in Fly-Traps, of which the following is a specification.

This invention relates to fly traps; and the object of the invention is to provide a device which is simple in construction, cheap to manufacture and one having the capacity for catching and holding a large number of flies.

A further object of the invention is to provide a fly trap wherein as the flies are lured under and away from the point of entrance they are enticed into the trap from which escape is impossible.

We accomplish the objects of the invention by means of the fly trap illustrated in the accompanying drawings, forming a part hereof, in which—

Figure 1:
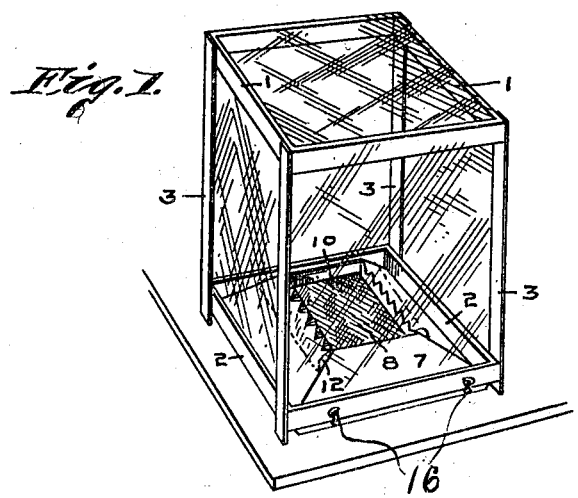
Figure 2:
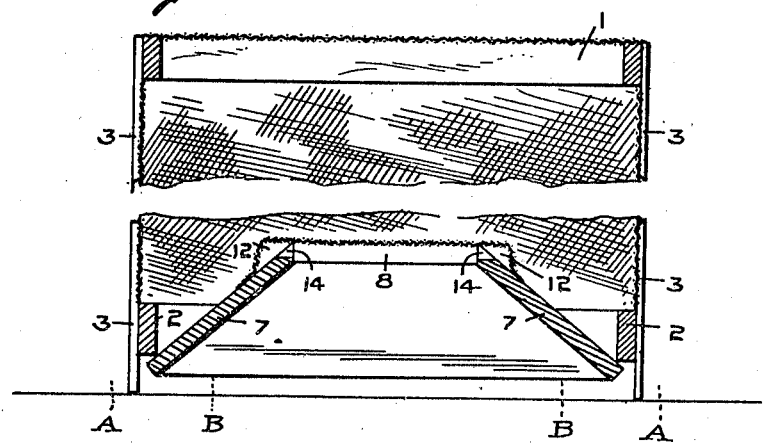
Figure 3:
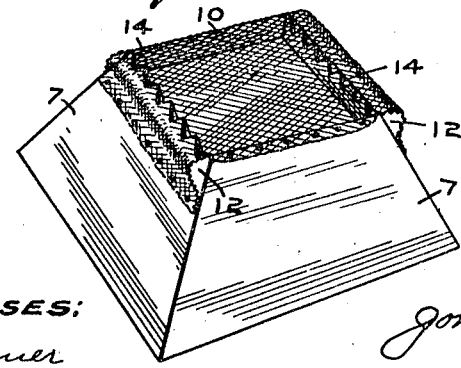

Figure 1 is a perspective view of our improved fly trap. Fig. 2 is a fragmentary detail central vertical sectional view of the upper and lower portions of the trap. Fig. 3 is a perspective view of the pyramidally formed base of the trap, the upper or cage portion thereof being omitted.

The fly trap comprises a rectangular skeleton frame, consisting of the upper and lower rectangular sections 1 and 2, and the uprights 3 which are usually placed at the corners and form the supports for the sections 1 and 2 and against which the wire netting is nailed. The sides, ends and top of this skeleton frame are inclosed by means of suitable wire netting, the frame so inclosed forming a receptacle or cage for receiving the flies after being admitted through the base of the trap. The uprights 3 project slightly below the lower member 2 of the skeleton frame so that the trap is slightly elevated above the floor line and provides the ingress or entrance to the trap from all sides thereof. Inclosing the lower end of the cage is a pyramidally formed base 7 which is provided with the centrally located opening or window 8 for admission of light to the chamber below said base. The base 7 is formed in the shape of a pyramid to provide a chamber below and is composed of metal or wood so that the floor surface beneath the marginal edge of the opening 8 and the outer marginal edge of the base casts a shaded belt around said opening. The floor around and partially under the trap—between imaginary lines A and B—is strewn with suitable bait to attract the flies. As the bait extends along the floor but a short distance beyond the outer marginal edge of the base 7 the flies, in devouring the bait, will be lured under the base, after which the general direction of movement will be toward the bright spot on the floor beneath the window or opening 8. After reaching the central and lighted portion of the floor the flies will not attempt to recross the shaded portion of the floor between the edge of the opening 8 and the outer edge of the base to the point of entrance, but the general movement will instinctively be toward the point of greatest illumination which point is the opening 8. When the flies reach the opening 8 further progress is impeded by means of the wire netting 10 which is placed over the opening 8. As a large opening, such as 8, must be provided to permit sufficient illumination of the chamber below the base to induce the flies to enter said chamber, such opening, without such overlaid netting would also permit the flies to pass uninterruptedly back from the cage to the base. We provide means, however, for enabling the flies to work their way from in under the wire netting 10 into the cage above, which is accomplished by extending the wire netting 10 a short distance beyond one or more of the edges of the opening 8 from which point the netting is bent downward and secured to the surface of the base 7. This arrangement in bending the netting 10 provides the transversely extending run or passageways 12 between said wire netting 10 and the outer surface of the base 7.

The flies are admitted to the passageways 12 by means of a plurality of notches 14 arranged in the adjacent marginal edges of the opening 8, and as they walk along the underneath surface of the netting 10 they will ultimately pass out through the notches 14 and into the run or passageways 12. After entering the passageways they move along until they reach the ends thereof at which points they are free to fly upward within the cage portion of the trap. As the upper portion of the cage is well lighted there is no disposition on the part of the flies to seek their way out along the circuitous route and through the shaded chamber below the base 7, as it is natural for the flies to remain near the top of the cage.

It will be noted that after the fly trap is set the operation of catching flies is carried on uninterruptedly, and the more flies that are within the cage the greater becomes the attraction as the flies within act as a decoy for those without. As the operation of catching flies continues the process of flies dying is a natural consequence during the same period of time. When the flies die they drop to the bottom of the cage where they are caught between the slanting sides of the base 7 and the wire netting forming the sides of the cage. When a quantity of dead flies have accumulated in the bottom of the cage the trap is shaken or agitated which causes the flies to settle at the top of the cage, at which time the base 7 may be detached from the cage, by loosening the hooks 16, allowing the dead flies to roll out without liberating any of the live ones.

Having thus fully described our said invention, what we desire to secure by Letters Patent, is—

1. A fly trap comprising an open bottom cage having its sides and top closed with perforated material, a base for said cage having an inwardly and upwardly extending wall and provided with a light opening in its top, and notches along opposite edges of said opening, perforated material overlying both the opening and notches, and passageways formed along said notches to receive the flies as they emerge from said notches, said passageways having discharge openings at the ends and beyond the notches leading into said passageways.

2. A fly trap comprising an open bottom cage having its sides and top closed with perforated material, a base for said cage having an inwardly and upwardly extending wall and provided with a light opening in its top, and notches along the opposite edges of said opening, perforated material overlying both the opening and notches, passageways formed along said notches to receive the flies as they emerge from said notches, said passageways having discharge openings located at one or more ends and beyond the notches leading into said passageways, and means for detachably securing said base to said cage.

3. A fly trap comprising an open bottom cage having its sides and top closed with perforated material, a base for said cage having an inwardly and upwardly extending wall and provided with a light opening in its top and with notches along the marginal edges of said opening, perforated material overlying both the opening and notches in the marginal edges of said opening, and passage ways formed along said notches to receive the flies as they emerge from said notches, said passage ways affording an avenue of escape for the flies into the cage.

4. A fly trap comprising a fly receiving cage having transparent sides and top and an open bottom, a base having upwardly converging walls adapted to fit into the open bottom of said cage, said base being provided with a light opening in its top and notches in the marginal edges of said opening to permit passage of the flies, perforated material adapted to extend across said opening and notches, and passageways extending over said notches, said passageways being formed by extending the perforated material beyond the edges of the opening and down to the surface of said base, said passageways forming an avenue of escape for the flies into the cage.

In witness whereof, I have hereunto set my hand and seal at Topeka, Kansas, this 3rd day of August, A. D. one thousand nine hundred and ten.

JACOB G. VOGT. [L. S.]

Witnesses:
WM. HURTE,
H. W. EULER.

In witness whereof, I have hereunto set my hand and seal at Indianapolis, Indiana, this 8th day of August, A. D. one thousand nine hundred and ten.

JOHN A. JOHNSON. [L. S.]

Witnesses:
F. W. WOERNER,
L. B. WOERNER.

---

Copies of this patent may be obtained for five cents each, by addressing the "Commissioner of Patents, Washington, D. C."